(12) United States Patent
Lai

(10) Patent No.: US 8,406,197 B2
(45) Date of Patent: Mar. 26, 2013

(54) WIRELESS NETWORK SYSTEM AND WIRELESS ACCESS POINT DEVICE AND WIRELESS TERMINAL DEVICE THEREOF

(75) Inventor: Chung-Chiu Lai, Hsinchu County (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 319 days.

(21) Appl. No.: 12/871,916

(22) Filed: Aug. 31, 2010

(65) Prior Publication Data
US 2012/0020339 A1 Jan. 26, 2012

(30) Foreign Application Priority Data
Jul. 20, 2010 (TW) ................ 99123837 A

(51) Int. Cl.
*H04W 4/00* (2009.01)
*H04L 1/00* (2006.01)
*H04W 36/00* (2009.01)
(52) U.S. Cl. .............. 370/331; 370/235; 455/436
(58) Field of Classification Search .......... None
See application file for complete search history.

(56) References Cited

U.S. PATENT DOCUMENTS

| | | | |
|---|---|---|---|
| 6,469,991 B1 | 10/2002 | Chuah | |
| 6,522,881 B1 | 2/2003 | Feder et al. | |
| 7,020,439 B2 | 3/2006 | Sinivaara et al. | |
| 2004/0068668 A1* | 4/2004 | Lor et al. | 713/201 |
| 2007/0019598 A1* | 1/2007 | Prehofer | 370/338 |
| 2007/0274211 A1* | 11/2007 | Tsubota | 370/229 |
| 2008/0085723 A1* | 4/2008 | Tsao et al. | 455/452.2 |
| 2008/0228942 A1* | 9/2008 | Lor et al. | 709/238 |
| 2009/0191858 A1* | 7/2009 | Calisti et al. | 455/422.1 |
| 2010/0240373 A1* | 9/2010 | Ji et al. | 455/436 |
| 2010/0275244 A1* | 10/2010 | Lor et al. | 726/3 |
| 2011/0039564 A1* | 2/2011 | Johnstone et al. | 455/436 |
| 2012/0201201 A1* | 8/2012 | Liu et al. | 370/328 |

FOREIGN PATENT DOCUMENTS
TW I279148 4/2007

* cited by examiner

*Primary Examiner* — Clemence Han
(74) *Attorney, Agent, or Firm* — Jianq Chyun IP Office

(57) ABSTRACT

A wireless network system and a wireless access point (AP) device and a wireless terminal device thereof are provided. The wireless network system includes at least a wireless AP device and at least a wireless terminal device. Each wireless AP device broadcasts a beacon including a load state content of the wireless AP device. Each wireless terminal device receives beacons of all wireless AP devices, and ranks load states of all wireless AP devices in a load list according to at least CPU utilization rates in the load state contents of all wireless AP devices respectively. When a wireless terminal device intends to establish a connection with one of the wireless AP devices, the wireless terminal devices searches through the load list to select a wireless AP device being in a low load state, and transmits a connection request message to the selected wireless AP device.

18 Claims, 6 Drawing Sheets

WIRELESS NETWORK SYSTEM AND WIRELESS ACCESS POINT DEVICE AND WIRELESS TERMINAL DEVICE THEREOF

CROSS-REFERENCE TO RELATED APPLICATION

This application claims the priority benefit of Taiwan application serial no. 99123837, filed on Jul. 20, 2010. The entirety of the above-mentioned patent application is hereby incorporated by reference herein and made a part of specification.

BACKGROUND

1. Field of the Invention

The invention relates to a load balancing mechanism of a wireless network. More particularly, the invention relates to a wireless network system having a load balancing mechanism and a wireless access point device and a wireless terminal device thereof.

2. Description of Related Art

Presently, wireless networks are widely used in various circumstances and occasions. In the wireless network system, multiple users can use wireless terminal devices to connect with a wireless AP device for accessing the wireless network. In a conventional wireless network (for example, a wireless network using an IEEE 802.11a/b/g/n standard), the wireless terminal device generally determines the wireless AP device to be connected according to signal intensities of radio frequency (RF) signals transmitted by the wireless AP devices. However, such connection establishment mechanism easily results in load unbalance of the wireless AP devices in the wireless network system.

For example, assuming two neighbouring wireless AP devices A and B are simultaneously located in a same area, and there are relatively more wireless terminal devices located close to the wireless AP device A during a certain period, since the conventional connection establishment method is to select the wireless AP device according to the signal intensity of the RF signal, and there are relatively more wireless terminal devices located close to the wireless AP device A, compared to the RF signal of the wireless AP device B, the RF signal strength of the wireless AP device A received by these terminal devices is stronger, so that there would be relatively more wireless terminal devices connected to the wireless AP device A, which may result in an overload state of the wireless AP device A.

If there are too many wireless terminal devices simultaneously being connected to a single wireless AP device, network connections of these wireless terminal devices become not smoothly quite easily, and users operating the wireless terminal devices may feel a slow and unstable network connection. Therefore, it is an important issue to averagely distribute the load of the wireless AP devices in the wireless network system.

SUMMARY

Accordingly, the invention is directed to a wireless network system and a wireless access point (AP) device and a wireless terminal device thereof, by which a load balancing mechanism in the wireless network system is achieved through a distributed structure.

According to one aspect, a wireless network system provided by the invention has a load balancing mechanism, and a wireless terminal device in the wireless network system aperiodically obtains current load states of all wireless AP devices in the same area, and maintains a load list of the load states of all wireless AP devices. Therefore, the wireless terminal device can select a wireless AP device being in a low load state according to the load states of all of the wireless AP devices, and send a connection request message to the selected wireless AP device.

According to another aspect, the wireless AP device can also determine whether or not to activate the load balancing mechanism according to its own load state. The wireless AP devices with activated load balancing mechanism can commonly determine whether or not to further accept a connection request message of a wireless terminal device, and one wireless AP device notifies the wireless terminal device that the connection request message thereof is acceptable. In this way, the wireless terminal device can transmit the connection request message to the wireless AP device being in the low load state, so as to achieve load balancing of the wireless network system.

According to an exemplary embodiment of the invention, the invention provides a wireless network system including at least a wireless AP device and at least a wireless terminal device. Each one of the wireless AP devices broadcasts a beacon including a load state content of the wireless AP device. Each one of the wireless terminal devices receives beacons of all wireless AP devices in a same area, and ranks load states of all wireless AP devices in a load list according to at least central processing unit (CPU) utilization rates in the load state contents of all wireless AP devices. Moreover, when a wireless terminal device intends to establish a connection with one of the wireless AP devices, the wireless terminal device searches through the load list to select a wireless AP device being in a low load state, and transmits a connection request message to the selected wireless AP device.

According to an exemplary embodiment of the invention, the invention provides a wireless AP device for providing a wireless network connection service to at least one wireless terminal device. The wireless AP device includes a wireless transceiver module, a memory module and a processor module. The wireless transceiver module is configured for wirelessly connecting at least one wireless AP device in a same area or at least one wireless terminal device. The memory module includes a communication protocol processing module and a load management module. The communication protocol processing module is coupled to the wireless transceiver module, and is configured for processing a connection request message transmitted by at least one wireless terminal device. The load management module is coupled to the communication protocol processing module, and is configured for broadcasting a beacon including a load state content of the wireless AP device, so that the wireless terminal device to be connected to the wireless AP device determines a load state of the wireless AP device according to the load state content. The processor module is coupled to the wireless transceiver module and the memory module, and is configured for executing the communication protocol processing module and the load management module, and controlling the wireless transceiver module and the memory module.

According to an exemplary embodiment of the invention, the invention provides a wireless terminal device adapted for connecting with a wireless AP device. The wireless terminal device includes a wireless transceiver module, a memory module and a processor module. The wireless transceiver module is configured for wirelessly connecting at least one wireless AP device in a same area. The memory module includes a communication protocol processing module and a connection management module. The communication protocol processing module is coupled to the wireless transceiver module, and is configured for sending a connection request message to the wireless AP device. The connection management module is coupled to the communication protocol processing module, and is configured for maintaining a load list of load states of a plurality of wireless AP devices in the same area, and ranking the load states of the wireless AP devices in the load list according to at least central processing unit (CPU) utilization rates of all wireless AP devices. The processor module is coupled to the wireless transceiver module and the memory module, and is configured for executing the communication protocol processing module and the connection management module, and controlling the wireless transceiver module and the memory module. Moreover, when the wireless terminal device intends to establish a connection with one of the wireless AP devices, the connection management module of the wireless terminal device searches through the load list to select a wireless AP device being in a low load state, and transmits a connection request message to the selected wireless AP device.

According to the above descriptions, in the wireless network system and the wireless AP device and the wireless terminal device thereof provided by exemplary embodiments of the invention, a time for the wireless terminal device polling each of the wireless AP devices during a connection establishment process is lowered, and unnecessary packet transmission is reduced, so as to reduce waste of bandwidth, and realize the load balancing of the wireless network.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
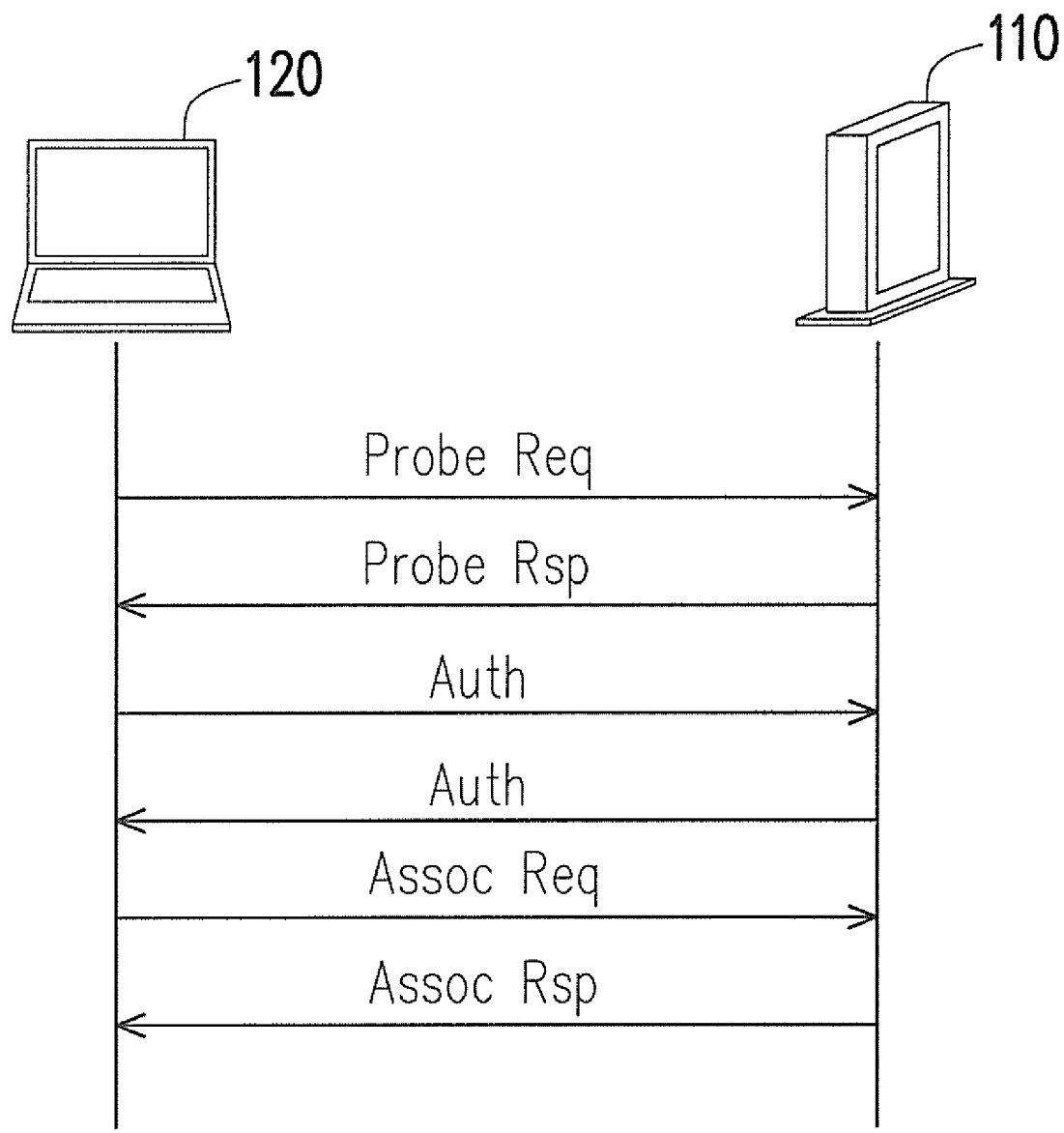
FIG. 1 is a schematic flowchart illustrating a process of establishing a connection between a wireless access point (AP) device and a wireless terminal device according to an exemplary embodiment of the invention.

FIG. 1 is a schematic flowchart illustrating a process of establishing a connection between a wireless access point (AP) device and a wireless terminal device according to an exemplary embodiment of the invention. Referring to FIG. 1, the wireless AP device 110 receives a connection request message from a wireless terminal device 120. The connection request message is, for example, a probe request (or Probe Req), an authentication, or an association request (or Assoc Req). The wireless AP device 110 replies a response message in response to the connection request message, for example, a probe response (or Probe Rsp), an authentication or an association response (or Assoc Rsp). After the connection is established, data can be transmitted between the wireless AP device 110 and the wireless terminal device 120. In the invention, control methods of the wireless AP device and the wireless terminal device 120 are further added to the above-described connection establishment mechanism, so as to achieve a distributed load balancing mechanism in a wireless network system.

Figure 2:
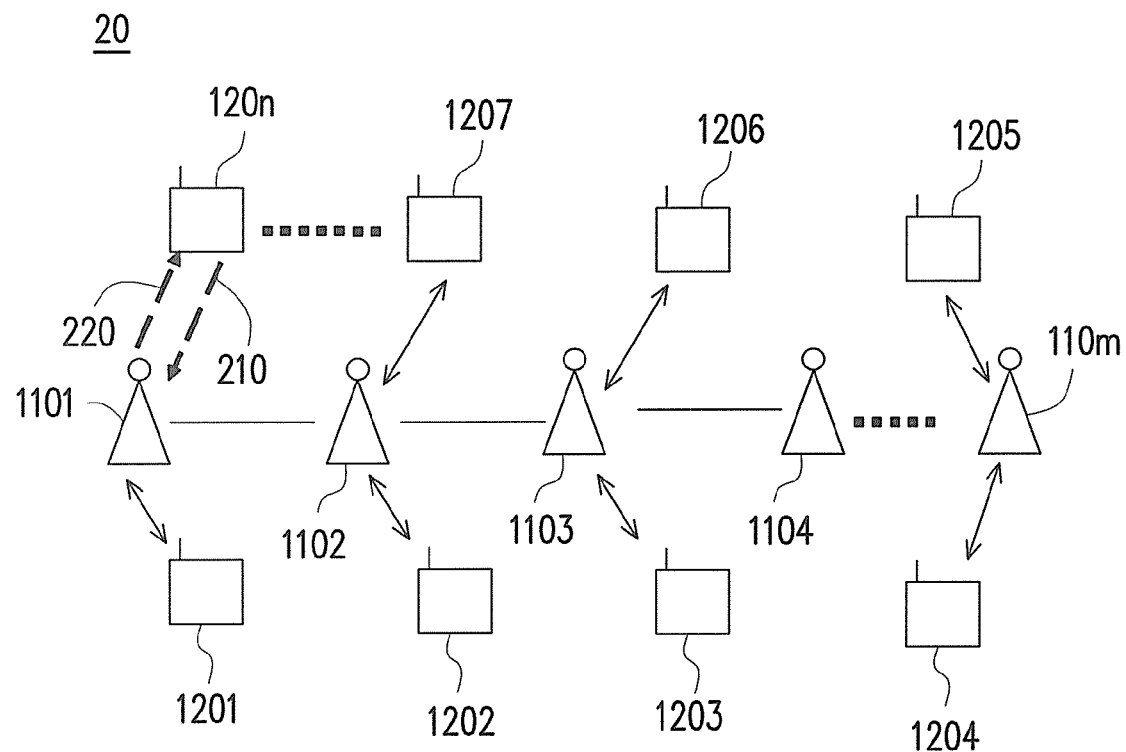
FIG. 2 is a schematic diagram illustrating a wireless network system according to an exemplary embodiment of the invention.

FIG. 2 is a schematic diagram illustrating a wireless network system 20 according to an exemplary embodiment of the invention. The wireless network system 20 includes a plurality of wireless AP devices 1101, 1102, 1103, 1104, . . . , 110$m$ distributed within a same area, where m is a positive integer. Moreover, the wireless network system 20 further includes a plurality of wireless terminal devices 1201, 1202, 1203, 1204, 1205, 1206, 1207, . . . , 120$n$ distributed in a neighbouring area of the wireless AP devices 1101, 1102, 1103, 1104, . . . , 110$m$, where n is a positive integer. The wireless terminal device is, for example, a desktop computer, a notebook computer, a smart phone, a personal digital assistant (PDA), a television, a multimedia player or a mobile communication device. The wireless terminal devices 1201-1207, . . . , 120$n$ may respectively send a connection request message to one of the wireless AP devices 1101-1104, . . . , 110$m$, and after the connection establishment mechanism of FIG. 1 is completed, data transmission is performed between the wireless terminal device and the connected wireless AP device.

Referring to FIG. 2 again, each one of the wireless AP devices (for example, the wireless AP devices 1101-1104, . . . , 110$m$) in the wireless network system 20 aperiodically broadcasts a beacon, and the beacon includes a load state content of the wireless AP device broadcasting the beacon. Further, each one of the wireless AP devices broadcasts a beacon when a load state thereof is changed, and the load state content of the beacon includes a central processing unit (CPU) utilization rate, a bandwidth utilization rate, a total number of connected wireless terminal devices and a load balance state of the wireless AP device broadcasting the beacon. One or a plurality of wireless terminal devices in the same area may learn whether the wireless AP device has activated a load balancing mechanism through the load balance state.

For example, assuming the wireless AP device 1101 is originally connected to the wireless terminal device 1201, and now a total number of the connected wireless terminal device is 1, and the CPU utilization rate is 5%. When an unconnected wireless terminal device 120$n$ sends a connection request message 210 to the wireless AP device 1101, and receives a response message 220 (roughly including the aforementioned probe response, the authentication and the association response) from the wireless AP device 1101, according to the connection establishment mechanism of FIG. 1, the total number of the connected wireless terminal devices of the wireless AP device 1101 is increased to 2, and the CPU utilization rate is correspondingly increased to 8%. Now, the wireless AP device 1101 broadcasts a beacon, so that one or a plurality of wireless terminal devices in the same area may obtain the updated total number of the connected wireless terminal devices and the updated CPU utilization rate of the wireless AP device 1101.

Referring to FIG. 2 again, each one of the wireless terminal devices (for example, the wireless terminal devices 1201-1207, . . . , 120n) in the wireless network system 20 receives one or a plurality of beacons of all wireless AP devices in the same area, maintains a load list of load states of all wireless AP devices in the same area, and ranks the load states of all wireless AP devices in the load list according to at least the CPU utilization rates of all wireless AP devices respectively. For example, the wireless terminal device 1201 collects information regarding the load states of the wireless AP devices 1102-1104, . . . , 110m, and ranks the load states of the wireless AP devices 1102-1104, . . . , 110m in a load list according to the obtained load state contents of all of the wireless AP devices.

Further, each one of the wireless terminal devices ranks the load state of each one of the wireless AP devices to be a high load state, a medium load state and a low load state in the load list according to the current CPU utilization rates, current bandwidth availability and the current total numbers of connected wireless terminal devices of all of the wireless AP devices. The bandwidth availability is, for example, 11 Mbps of IEEE 802.11b standard, 54 Mbps of IEEE 802.11g standard and 450 Mbps of IEEE 802.11n standard.

In the present exemplary embodiment, when a wireless terminal device intends to establish a connection with one of the wireless AP devices, the wireless terminal device searches through the load list to select a wireless AP device being in the low load state, and transmits a connection request message to the selected wireless AP device. For example, when the wireless terminal device 120n intends to establish the connection, the wireless terminal device 120n searches through a currently maintained load list, and after comparison, the wireless terminal device 120n first selects a wireless AP device having the minimum CPU utilization rate. If there are more than one wireless AP devices having the minimum CPU utilization rate, the wireless terminal device 120n further selects a wireless AP device having the lowest bandwidth availability. Assuming there are still more than one wireless AP devices having the lowest bandwidth availability, the wireless terminal device 120n further selects a wireless AP device (for example, the wireless AP device 1104) having the least total number of the connected wireless terminal devices. Finally, the wireless terminal device 120n transmits a connection request message to the wireless AP device 1104 to establish the connection.

In the present exemplary embodiment, assuming the wireless AP device 1101 has activated the load balancing mechanism, when the wireless terminal device 120n sends a connection request message to the wireless AP device 1101, the wireless AP device 1101 may not to reply the connection request message (including the probe request, the authentication, or the association request) of the wireless terminal device 120n, or transmits back a disassociation message to the wireless terminal device 120n, where a reason code of the disassociation message is 5, which represents that the wireless AP device 1101 is disassociated from the wireless terminal device 120n due to that the wireless AP device 1101 cannot simultaneously process all of the associated wireless terminal devices.

In the wireless network system 20, each one of the wireless AP devices further determines whether or not to activate its load balancing mechanism according to the total number of the connected wireless terminal devices, the CPU utilization rate and the bandwidth availability. If a wireless AP device determines its total number of the connected wireless terminal devices is greater than a predetermined connection number threshold M, such wireless AP device activates the load balancing mechanism. If a wireless AP device determines its CPU utilization rate is greater than a first CPU utilization rate threshold, such wireless AP device activates the load balancing mechanism. If a wireless AP device determines its bandwidth availability is greater than a first bandwidth availability threshold, such wireless AP device activates the load balancing mechanism. Moreover, when a wireless AP device activates the load balancing mechanism, the wireless AP device adjusts a load balance state in a broadcasted beacon to an activated load balance state.

In the present exemplary embodiment, the wireless AP devices (for example, the wireless AP devices 1101-1104, . . . , 110m) can communicate with each other through an inter access point protocol (IAPP), so as to determine whether all wireless AP devices have activated the load balancing mechanism. However, the invention is not limited to the IAPP, and the wireless AP devices can respectively update the load states by using other communication protocols. Moreover, after all wireless AP devices have activated the load balancing mechanism, the wireless AP devices can collaboratively determine whether or not to accept a connection request message of a newly joined wireless terminal device through the IAPP.

In an exemplary embodiment of the invention, after all of the wireless AP devices have activate the load balancing mechanism, and have determined to accept the connection request message of the newly added wireless terminal device, the wireless AP devices collaboratively select one wireless AP device to broadcast a beacon to notify the newly joined wireless terminal device that its connection request message is acceptable. Moreover, the newly joined wireless terminal device transmits the connection request message to the selected wireless AP device to establish the connection, where the connection request message includes a probe request packet of an identification message, and the selected wireless AP device confirms to accept the connection request message according to the identification message.

In the wireless network system 20, a plurality of the wireless AP devices may decide to collaboratively process a connection request message of an unconnected wireless terminal device. When all of the wireless AP devices (for example, the wireless AP devices 1101-1104, . . . , 110m) in the same area have activated the load balancing mechanism, the wireless AP devices respectively use the IAPP to communicate with each other about their own load states, and determine whether or not to receive the connection request message of the unconnected wireless terminal device.

When all of the wireless AP devices have activated the load balancing mechanism, and all of the wireless AP devices have collaboratively determined to accept the connection request message of the unconnected (newly joined) wireless terminal device, the wireless AP devices further collaboratively determine a wireless AP device to accept the connection request message according to the current CPU utilization rate, the bandwidth availability and the total number of the connected wireless terminal device of each one of the wireless AP devices. For example, the wireless AP devices 1101-1104, . . . , 110m can respectively and sequentially search through the load lists to collaboratively select a wireless AP device (for example, the wireless AP device 1103) having relatively low CPU utilization rate, relatively low bandwidth availability and relatively less number of connected wireless terminal devices, and notify the selected wireless AP device to accept the connection request message of the unconnected wireless terminal device (for example, the wireless terminal device 120*n*). After the wireless network system 20 is introduced, functional block diagrams of a wireless AP device and a wireless terminal device are introduced with reference of FIG. 3A and FIG. 3B.

Figure 3A:
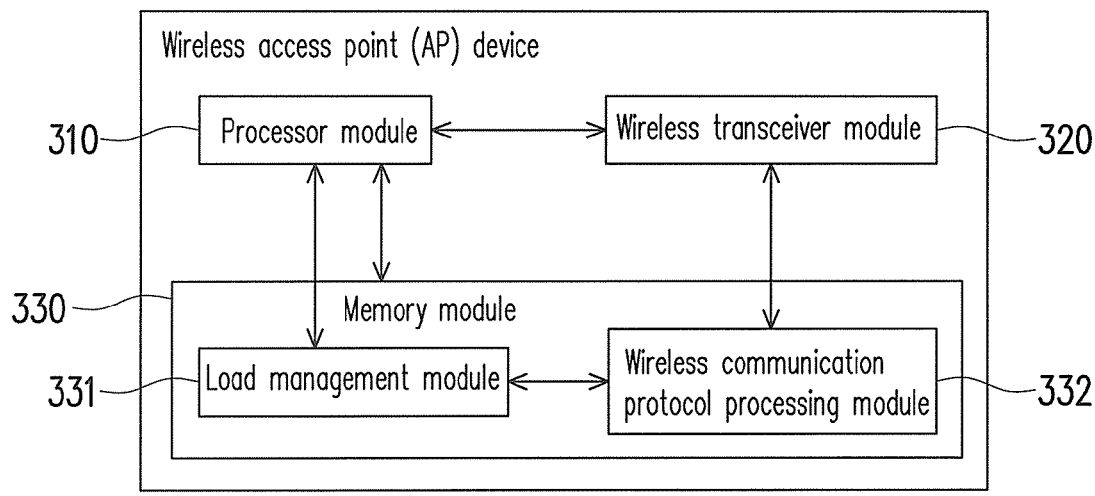
FIG. 3A is a functional block diagram illustrating a wireless AP device according to an exemplary embodiment of the invention.

FIG. 3A is a functional block diagram illustrating a wireless AP device 30 according to an exemplary embodiment of the invention. The wireless AP device 30 represents the wireless AP devices 1101-1104, . . . , 110*m* in the wireless network system 20 of FIG. 2. Referring to FIG. 2 and FIG. 3A, the wireless AP device 30 includes a processor module 310, a wireless transceiver module 320 and a memory module 330. The wireless transceiver module 320 is configured for wirelessly connecting with at least one wireless AP device in the same area or at least one wireless terminal device, and the wireless transceiver module 320 includes at least one antenna unit (not shown). The processor module 310 may include one or a plurality of CPUs.

Referring to FIG. 3A, the memory module 330 includes a load management module 331 and a communication protocol processing module 332. The communication protocol processing module 332 is coupled to the wireless transceiver module 320, and is configured for processing a connection request message sent by at least one wireless terminal device. The load management module 331 is coupled to the communication protocol processing module 332, and is configured for broadcasting a beacon including a load state content of the wireless AP device, so that a wireless terminal device to be connected may determine a load state of the wireless AP device according to the load state content. The memory module 330 may further include operating system software, a firmware module, driving program software or other application programs, and the processor module 310 can execute these software or firmware, though these software or firmware are not main features of the invention, so that detailed descriptions thereof are omitted.

Referring to FIG. 2 and FIG. 3A, the processor module 310 is coupled to the wireless transceiver module 320 and the memory module 330, and is configured for executing the load management module 331 and the communication protocol processing module 332, and controlling the wireless transceiver module 320 and the memory module 330. Moreover, when a wireless terminal device sends a connection request message to the wireless AP device 30, the load management module 331 selects to accept or process the connection request message or reject the connection request message according to a CPU utilization rate of the processor module 330.

In the present exemplary embodiment, the load management module 331 can further determine whether or not to activate the load balancing mechanism according to the total number of the connected wireless terminal devices, the CPU utilization rate and the bandwidth availability, and details thereof may be referred to the above related descriptions that the wireless AP device determines to activate the load balancing mechanism. However, the invention is not limited thereto, and in other exemplary embodiments, the load management module 331 and the communication protocol processing module 332 can be replaced by hardware units, and the processor module 310 controls and collaborates the load management module (not shown) and the communication protocol processing module (not shown).

Figure 3B:
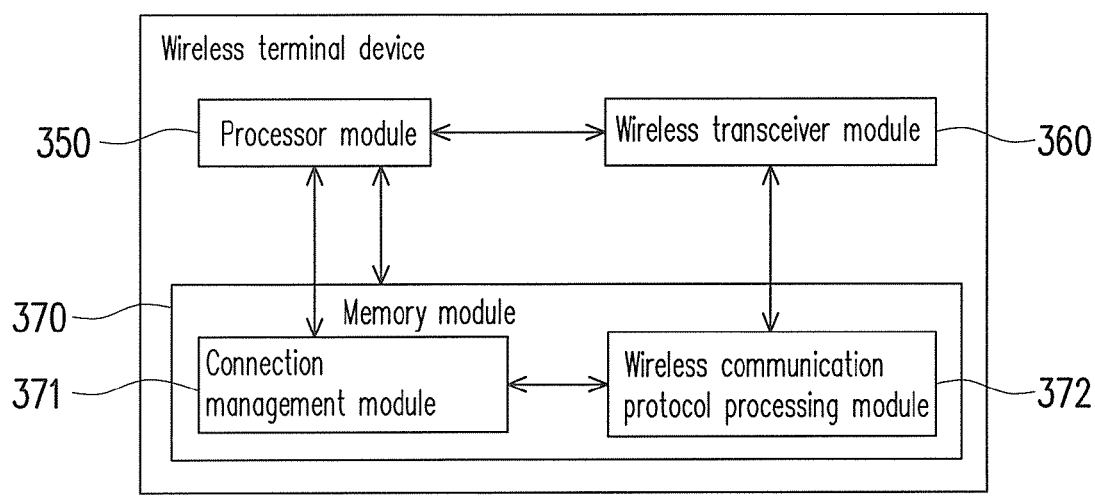
FIG. 3B is a functional block diagram illustrating a wireless terminal device according to an exemplary embodiment of the invention.

FIG. 3B is a functional block diagram illustrating a wireless terminal device 35 according to an exemplary embodiment of the invention. The wireless terminal device 35 represents the wireless terminal devices 1201-1207, . . . , 120*n* in the wireless network system 20 of FIG. 2. Referring to FIG. 2 and FIG. 3B, the wireless terminal device 35 includes a processor module 350, a wireless transceiver module 360 and a memory module 370. The wireless transceiver module 360 is configured for wirelessly connecting at least one wireless AP device in the same area, and the wireless transceiver module 360 includes at least one antenna unit (not shown).

In the present exemplary embodiment, the memory module 370 includes a connection management module 371 and a communication protocol processing module 372. The communication protocol processing module 372 is coupled to the wireless transceiver module 360, and is configured for sending a connection request message to at least one wireless AP device. The connection management module 371 is coupled to the communication protocol processing module 372, and is configured for maintaining a load list of load states of a plurality of the wireless AP devices in the same area, and ranking the load states of the wireless AP devices in the load list according to at least the CPU utilization rates of all wireless AP devices. When the wireless terminal device 35 intends to establish a connection with one of the wireless AP devices, the connection management module 371 searches through the load list to select a wireless AP device being in the low load state, and transmits a connection request message to the selected wireless AP device.

The processor module 350 is coupled to the wireless transceiver module 360 and the memory module 370, and is configured for executing the connection management module 371 and the communication protocol processing module 372 and controlling the wireless transceiver module 360 and the memory module 370. The processor module 350 may include one or a plurality of CPUs.

In the present exemplary embodiment, the connection management module 371 receives one or a plurality of beacons of multiple wireless AP devices in the same area, obtains the load state contents of the wireless AP devices from the beacons, and maintains a load list of the load states of the wireless AP devices in the same area according to the load state contents. The connection management module 371 further ranks the load state of each one of the wireless AP devices to be the high load state, the medium load state and the low load state in the load list according to the current CPU utilization rates, the current bandwidth availability and the current total numbers of the connected wireless terminal devices of all of the wireless AP devices.

Further, in the present exemplary embodiment, in the load list of the wireless terminal device 35, when the total number of the connected wireless terminal device of a wireless AP device is less than or equal to a predetermined connection number threshold M, the CPU utilization rate is less than or equal to a first CPU utilization rate threshold (for example, 30%), and the bandwidth availability is less than or equal to a first bandwidth availability threshold (for example, 30%), the connection management module 371 of the wireless terminal device 35 determines that such wireless AP device has the low load state. The above determination condition is a condition of classifying a wireless AP device into a low load group, and the predetermined connection number threshold M is a positive integer.

In the present exemplary embodiment, in the load list of the wireless terminal device 35, when the total number of the connected wireless terminal device of a wireless AP device is less than or equal to the predetermined connection number threshold M, the CPU utilization rate is less than or equal to a second CPU utilization rate threshold (for example, 60%), and the bandwidth availability is less than or equal to a second bandwidth availability threshold (for example, 60%), the connection management module 371 of the wireless terminal device 35 determines that such wireless AP device is in the medium load state. The above determination condition is a condition of classifying a wireless AP device into a medium load group.

In the present exemplary embodiment, in the load list of the wireless terminal device 35, when the total number of the connected wireless terminal device of a wireless AP device is greater than the predetermined connection number threshold M, or the CPU utilization rate is greater than the second CPU utilization rate threshold, or the bandwidth availability is greater than the second bandwidth availability threshold, the connection management module 371 of the wireless terminal device 35 determines that such wireless AP device is in the high load state. The above determination condition is a condition of classifying a wireless AP device into a high load group. After detailed functional elements of the wireless AP device and the wireless terminal device are introduced, a detailed flow of a wireless network load balancing method is further introduced with reference of FIG. 4-FIG. 6.

Figure 4:
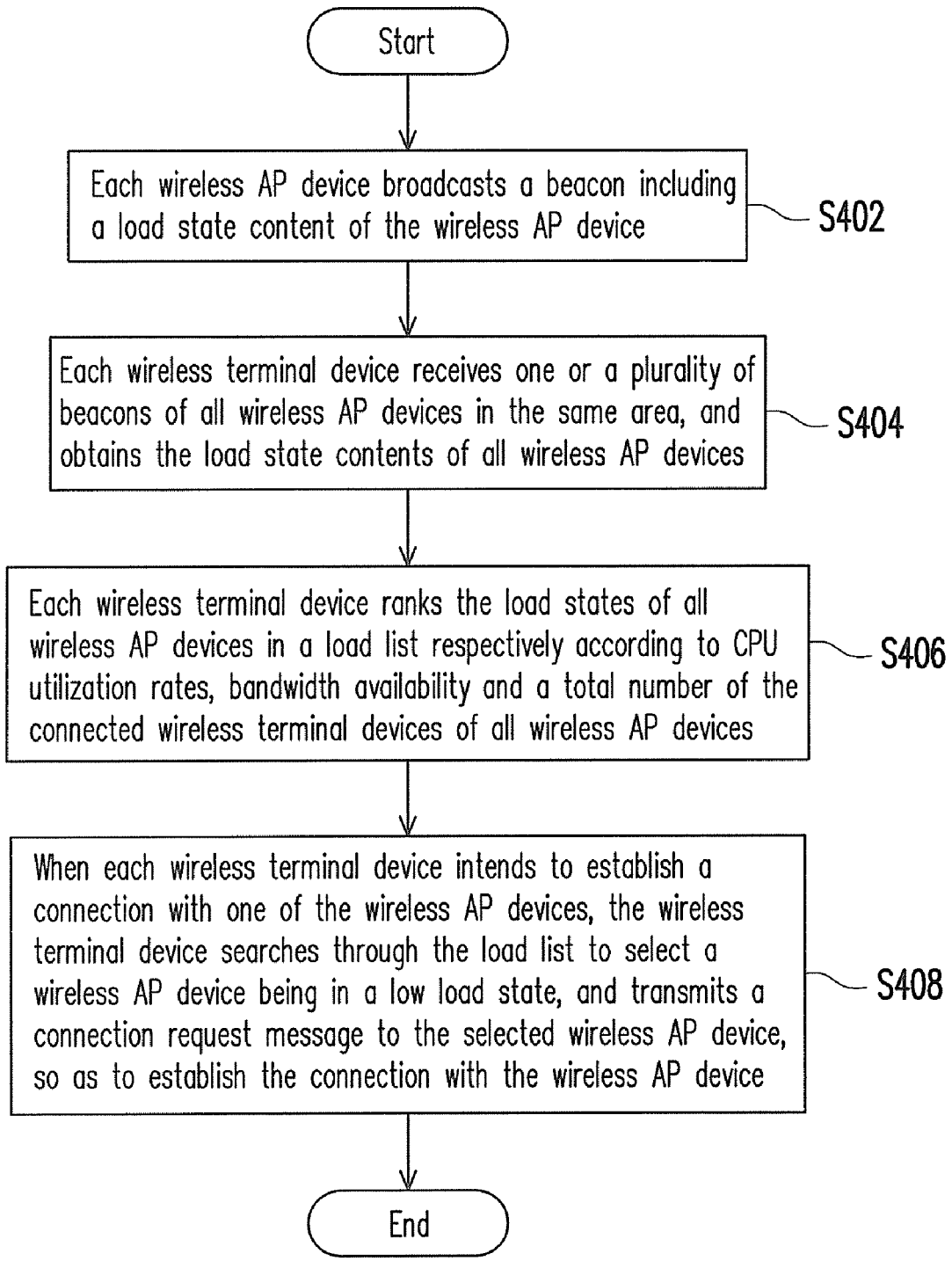
FIG. 4 is a flowchart illustrating a wireless network load balancing method according to an exemplary embodiment of the invention.

FIG. 4 is a flowchart illustrating a wireless network load balancing method 400 according to an exemplary embodiment of the invention. Referring to FIG. 2, FIG. 3A, FIG. 3B and FIG. 4, the wireless network load balancing method 400 is started from a step S402. The load management module of each one of the wireless AP devices broadcasts a beacon including a load state content of each one of the wireless AP devices through the wireless transceiver module (step S402). The connection management module of each one of the wireless terminal devices receives one or a plurality of beacons of all wireless AP devices in the same area, and obtains the load state contents of all wireless AP devices (step S404).

The connection management module of each one of the wireless terminal devices ranks the load states of all wireless AP devices in a load list according to the CPU utilization rates, the bandwidth availability and the total numbers of the connected wireless terminal devices of all wireless AP devices (step S406). When each one of the wireless terminal devices intends to establish a connection with one of the wireless AP devices, the connection management module of the wireless terminal device searches the load list to select a wireless AP device being in the low load state, and transmits a connection request message to the selected wireless AP device, so as to establish the connection with the wireless AP device (step S408). By now, the method 400 is terminated.

Figure 5:
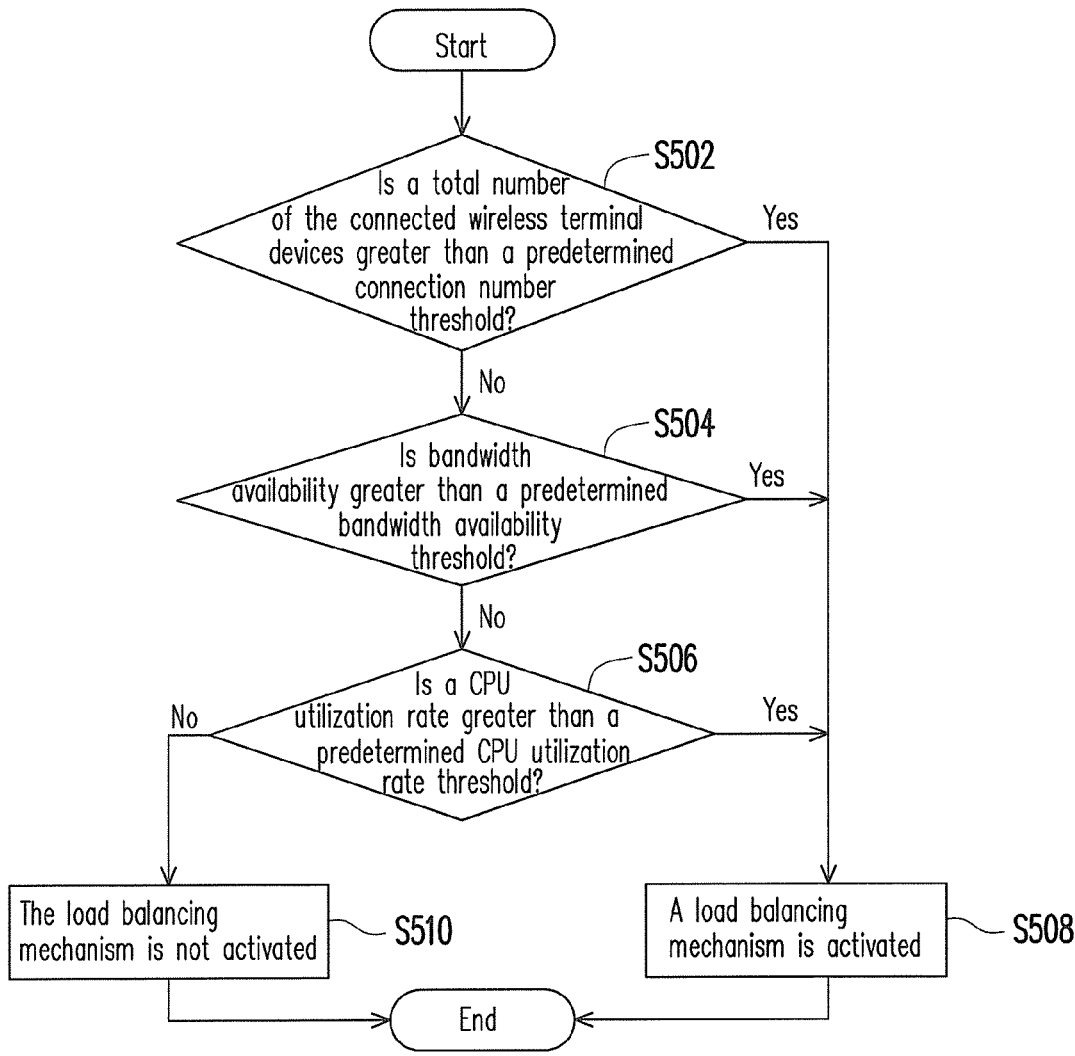
FIG. 5 is a flowchart illustrating a method of activating a load balancing mechanism according to an exemplary embodiment of the invention.

FIG. 5 is a flowchart illustrating a method 500 of activating a load balancing mechanism according to an exemplary embodiment of the invention. The method 500 is started from a step S502. A load management module of a wireless AP device determines whether a current total number of the connected wireless terminal devices is greater than a predetermined connection number threshold (step S502). If the current total number of the connected wireless terminal devices is greater than the predetermined connection number threshold, after the step S502, a step S508 is executed; and if the current total number of the connected wireless terminal devices is less than the predetermined connection number threshold, after the step S502, a step S504 is executed.

Next, the load management module of the wireless AP device determines whether current bandwidth availability is greater than a predetermined bandwidth availability threshold (step S504). If the current bandwidth availability is greater than the predetermined bandwidth availability threshold, after the step S504, the step S508 is executed; and if the current bandwidth availability is less than the predetermined bandwidth availability threshold, after the step S504, a step S506 is executed.

Next, the load management module of the wireless AP device determines whether a current CPU utilization rate is greater than a predetermined CPU utilization rate threshold (step S506). If the current CPU utilization rate is greater than the predetermined CPU utilization rate threshold, after the step S506, the step S508 is executed; and if the current CPU utilization rate is less than a predetermined CPU utilization rate threshold, after the step S506, a step S510 is executed. In the step S508, the load management module of the wireless AP device selects to activate the load balancing mechanism. Conversely, in the step S510, the load management module of the wireless AP device selects not to activate the load balancing mechanism. After the step S508 and the step S510, the method 500 is terminated.

Figure 6:
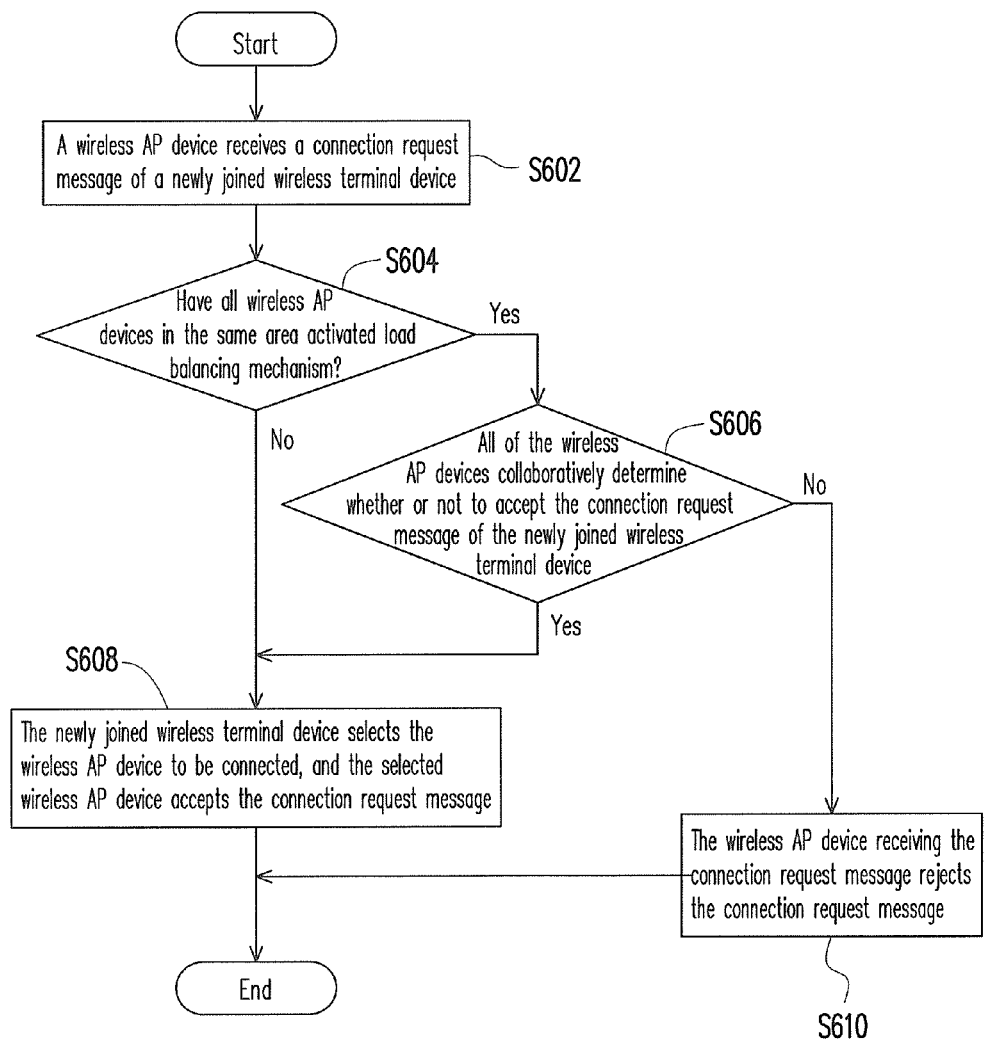
FIG. 6 is a flowchart illustrating another wireless network load balancing method according to another exemplary embodiment of the invention.

FIG. 6 is a flowchart illustrating another wireless network load balancing method 600 according to another exemplary embodiment of the invention. A difference between the wireless network load balancing method 600 and the wireless network load balancing method 400 is that when all of the wireless AP devices in the same area have activated the load balancing mechanism, the wireless AP devices can collaboratively determine whether or not to further accept a connection request message of an unconnected wireless terminal device. Referring to FIG. 2, FIG. 3A, FIG. 3B and FIG. 6, the method 600 is started from a step S602. A load management module of a wireless AP device receives a connection request message sent by a connection management module of a newly joined wireless terminal device (step S602). In step S604, the load management module of the wireless AP device communicate with other wireless AP devices in the same area through the IAPP, so as to confirm or determine whether all wireless AP devices in the same area have activated the load balancing mechanism. If all wireless AP devices in the same area have activated the load balancing mechanism, after the step S604, a step S606 is executed. Conversely, if not all wireless AP devices in the same area have activated the load balancing mechanism, after the step S604, a step S608 is executed.

In the step S606, all of the wireless AP devices commonly or collaboratively determine whether or not to accept the connection request message of the newly joined wireless terminal device. Then, in step S610, the load management module of the wireless AP device receiving the connection request message notifies a communication protocol processing module to reject the connection request message. Moreover, in the step S608, the connection management module of the newly joined wireless terminal device selects the wireless AP device to be connected, and the selected wireless AP device accepts the connection request message. After the steps S608 and S610, the method 600 is terminated.

In summary, exemplary embodiments of the invention provide a wireless network system and a wireless AP device and a wireless terminal device thereof. The wireless network system has a load balancing mechanism, which can averagely distribute the connections of the wireless terminal devices to the wireless AP devices in the same area, so as to optimize the connections of the wireless network. The wireless terminal device receives the load state contents broadcasted by the wireless AP devices, so as to maintain a load list of the load states of all of the wireless AP devices in the same area, and select a wireless AP device being in the low load state to establish the connection according to the load state of each of the wireless AP devices, so as to achieve the load balance of the wireless network system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wireless network system, comprising:
a plurality of wireless access point (AP) devices, wherein each one of the plurality of wireless AP devices is configured for broadcasting a beacon comprising a load state content of each one of the plurality of wireless AP devices; and
a plurality of wireless terminal devices, wherein each one of the plurality of wireless terminal devices is configured for receiving one or a plurality of beacons of all the wireless AP devices in a same area, and ranking load states of all the wireless AP devices in a load list at least according to at least a central processing unit (CPU) utilization rate in the load state contents of all the wireless AP devices,
wherein when one of the plurality of wireless terminal devices is intended to establish a connection with one of the plurality of wireless AP devices, the wireless terminal device searches through the load list to select one of the plurality of wireless AP devices being in a low load state, and transmits a connection request message to the selected wireless AP device.

2. The wireless network system as claimed in claim 1, further characterized in that:
each one of the plurality of wireless AP devices broadcasts the beacon when the load state of the wireless AP device is changed, wherein the load state content comprises the CPU utilization rate, a bandwidth availability, a total number of connected wireless terminal devices and a load balance state of the wireless AP device.

3. The wireless network system as claimed in claim 2, further characterized in that:
each one of the plurality of wireless terminal devices maintains the load list of the load states of all the wireless AP devices; and
each one of the plurality of wireless terminal devices further ranks the load state of each one of the plurality of wireless AP devices to be a high load state, a medium load state and a low load state in the load list according to the CPU utilization rate, the bandwidth utilization rates and the total number of connected wireless terminal devices of all the wireless AP devices.

4. The wireless network system as claimed in claim 3, further characterized in that:
the low load state is that the total number of the connected wireless terminal devices of one of the plurality of wireless AP devices is less than or equal to a predetermined connection number threshold, the CPU utilization rate is less than or equal to a first CPU utilization rate threshold, and the bandwidth availability is less than or equal to a first bandwidth availability threshold;
the medium load state is that the total number of the connected wireless terminal devices of one of the plurality of wireless AP devices is less than or equal to the predetermined connection number threshold, the CPU utilization rate is less than or equal to a second CPU utilization rate threshold, and the bandwidth availability is less than or equal to a second bandwidth availability threshold; and
the high load state is that the total number of the connected wireless terminal devices of one of the plurality of wireless AP devices is greater than the predetermined connection number threshold, or the CPU utilization rate is greater than the second CPU utilization rate threshold, or the bandwidth availability is greater than the second bandwidth availability threshold.

5. The wireless network system as claimed in claim 1, wherein the connection request message comprises a probe request packet, an authentication request packet, or an association request packet.

6. The wireless network system as claimed in claim 1, further characterized in that:
if one of the plurality of wireless AP devices determines its total number of the connected wireless terminal devices being greater than a predetermined connection number threshold, the wireless AP device activates a load balancing mechanism;
if the wireless AP device determines its CPU utilization rate being greater than a first CPU utilization rate threshold, the wireless AP device activates the load balancing mechanism; and
if the wireless AP device determines its bandwidth availability being greater than a first bandwidth availability threshold, the wireless AP device activates the load balancing mechanism.

7. The wireless network system as claimed in claim 6, further characterized in that:
when the activating wireless AP device has activated the load balancing mechanism, the activating wireless AP device adjusts the load balance state in the broadcasted beacon into an activated load balance state;
when all the wireless AP devices have activated the load balancing mechanism, the wireless AP devices use an inter access point protocol (IAPP) to respectively communicate with each other about their own load states, and collaboratively determine whether or not to accept a connection request message of a newly joined wireless terminal device; and
when all the wireless AP devices have activated the load balancing mechanism, and have determined to accept the connection request message of the newly joined wireless terminal device, the wireless AP devices select one of the plurality of wireless AP device to broadcast a beacon to notify the newly joined wireless terminal device that the connection request message is acceptable, and the newly joined wireless terminal device transmits the connection request message to the selected wireless AP device, wherein the connection request message comprises a probe request packet of an identification message.

8. A wireless AP device, adapted for providing a wireless network connection service to at least one wireless terminal device, the wireless AP device comprising:
a wireless transceiver module, configured for wirelessly connecting with at least one wireless AP device in a same area or the at least one wireless terminal device;
a memory module, comprising:
a communication protocol processing module, coupled to the wireless transceiver module, configured for processing a connection request message sent by the at least one wireless terminal device; and
a load management module, coupled to the communication protocol processing module, configured for broadcasting a beacon including a load state content of the wireless AP device, so that the at least one wireless terminal device to be connected to the wireless AP device determines a load state of the wireless AP device according to the load state content; and
a processor module, coupled to the wireless transceiver module and the memory module, configured for executing the communication protocol processing module and the load management module, and controlling the wireless transceiver module and the memory module.

9. The wireless AP device as claimed in claim 8, wherein when the load management module confirms that the load state of the wireless AP device is changed, the load management module broadcasts the beacon, wherein the load state content comprises a CPU utilization rate, a bandwidth availability, a total number of connected wireless terminal devices and a load balance state of the wireless AP device.

10. The wireless AP device as claimed in claim 9, further characterized in that:
the connection request message comprises a probe request packet, an authentication request packet, or an association request packet;
when the load management module determines the total number of the connected wireless terminal devices of the wireless AP device is greater than a predetermined connection number threshold, the load management module activates a load balancing mechanism;
when the load management module determines the CPU utilization rate of the wireless AP device is greater than a first CPU utilization rate threshold, the load management module activates the load balancing mechanism; and
when the load management module determines the bandwidth availability of the wireless AP device is greater than a first bandwidth availability threshold, the load management module activates the load balancing mechanism.

11. The wireless AP device as claimed in claim 10, further characterized in that:
when the load management module has activated the load balancing mechanism, the load management module adjusts the load balance state in the broadcasted beacon into an activated load balance state;
when all the wireless AP devices in the same area have activated the load balancing mechanism, the load management module uses an inter access point protocol (IAPP) to communicate with the other wireless AP devices in the same area about the load state of said wireless AP device, and the wireless AP devices collaboratively determine whether or not to accept a connection request message of a newly joined wireless terminal device; and
when all the wireless AP devices have activated the load balancing mechanism, the load management module notifies the communication protocol processing module to broadcast a beacon, so that the newly joined wireless terminal device learns that the connection request message is acceptable.

12. A wireless terminal device, adapted for connecting a wireless AP device, the wireless terminal device comprising:
a wireless transceiver module, configured for wirelessly connecting at least one wireless AP device in a same area;
a memory module, comprising:
a communication protocol processing module, coupled to the wireless transceiver module, configured for sending a connection request message to the wireless AP device; and
a connection management module, coupled to the communication protocol processing module, configured for maintaining a load list of load states of a plurality of wireless AP devices in the same area, and ranking the load states of the wireless AP devices in the load list at least according to a central processing unit (CPU) utilization rate of all the wireless AP devices; and
a processor module, coupled to the wireless transceiver module and the memory module, configured for executing the communication protocol processing module and the connection management module, and controlling the wireless transceiver module and the memory module,
wherein when the wireless terminal device is intended to establish a connection with one of the wireless AP devices, the connection management module searches through the load list to select one of the wireless AP devices being in a low load state, and transmits the connection request message to the selected wireless AP device.

13. The wireless terminal device as claimed in claim 12, wherein the connection management module receives one or a plurality of beacons from a plurality of the wireless AP devices in the same area, obtains a load state content of each one of the plurality of wireless AP devices from the beacons, and maintains the load list of the load states of the wireless AP devices in the same area according to the load state contents.

14. The wireless terminal device as claimed in claim 12, wherein the load state content comprises the CPU utilization rate, a bandwidth availability, a total number of connected wireless terminal devices and a load balance state of a wireless AP device.

15. The wireless terminal device as claimed in claim 14, wherein the connection management module ranks the load state of each one of the plurality of wireless AP devices to be a high load state, a medium load state and a low load state in the load list according to the CPU utilization rate, the bandwidth availability and the total number of connected wireless terminal devices of each one of the plurality of wireless AP devices.

16. The wireless terminal device as claimed in claim 15, further characterized in that:
when the total number of the connected wireless terminal devices of a wireless AP device is less than or equal to a predetermined connection number threshold, the CPU utilization rate is less than or equal to a first CPU utilization rate threshold, and the bandwidth availability is smaller than or equal to a first bandwidth availability threshold, the connection management module determines that the wireless AP device is in the low load state;
when the total number of the connected wireless terminal devices of the wireless AP device is less than or equal to the predetermined connection number threshold, the CPU utilization rate is less than or equal to a second CPU utilization rate threshold, and the bandwidth availability is less than or equal to a second bandwidth availability threshold, the connection management module determines that the wireless AP device is in the medium load state; and
when the total number of the connected wireless terminal devices of the wireless AP device is greater than the predetermined connection number threshold, or the CPU utilization rate is greater than the second CPU utilization rate threshold, or the bandwidth availability is greater than the second bandwidth availability threshold, the connection management module determines that the wireless AP device is in the high load state.

17. The wireless terminal device as claimed in claim 12, wherein the connection request message comprises a probe request packet, an authentication request packet, or an association request packet.

18. The wireless terminal device as claimed in claim 17, wherein when all the wireless AP devices have activated a load balancing mechanism, and have determined to accept the connection request message of the wireless terminal device, the wireless terminal device is characterized in that:

the connection management module receives a beacon broadcasted by one of the wireless AP devices to learn that the connection request message is acceptable; and the connection management module transmits the connection request message to the selected wireless AP device, wherein the connection request message comprises a probe request packet of an identification message.

* * * * *